(12) United States Patent
Bostick

(10) Patent No.: US 8,136,425 B2
(45) Date of Patent: Mar. 20, 2012

(54) BACK LIGHT OF STEERING WHEEL

(75) Inventor: William E. Bostick, Saint Clair, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/081,235

(22) Filed: Apr. 6, 2011

(65) Prior Publication Data

US 2011/0179902 A1 Jul. 28, 2011

Related U.S. Application Data

(62) Division of application No. 11/558,584, filed on Nov. 10, 2006, now Pat. No. 7,934,439.

(60) Provisional application No. 60/735,201, filed on Nov. 10, 2005.

(51) Int. Cl.
*B62D 1/04* (2006.01)
*B62D 1/06* (2006.01)
*B60Q 1/00* (2006.01)
*B60Q 1/26* (2006.01)

(52) U.S. Cl. ............. 74/552; 74/558; 362/487; 362/488

(58) Field of Classification Search .................... 74/552, 74/558; 280/728.3; 701/49; 340/438; 362/487, 362/488, 26; 345/173; *B62D 1/06*
See application file for complete search history.

(56) References Cited

U.S. PATENT DOCUMENTS

| | | | | |
|---|---|---|---|---|
| 1,089,996 A | * | 3/1914 | Walker | 40/615 |
| 1,771,817 A | * | 7/1930 | Ragsdale | 33/264 |
| 1,879,057 A | * | 9/1932 | Bray | 362/503 |
| 4,835,512 A | * | 5/1989 | Bratton | 340/457.2 |
| 5,203,226 A | | 4/1993 | Hongou et al. | |
| 7,414,520 B2 | | 8/2008 | Meißner | |
| 2004/0017687 A1 | * | 1/2004 | Misaras | 362/489 |
| 2004/0095739 A1 | | 5/2004 | Parker et al. | |
| 2005/0052348 A1 | * | 3/2005 | Yamazaki et al. | 345/44 |
| 2006/0271261 A1 | | 11/2006 | Flores et al. | |
| 2007/0228028 A1 | * | 10/2007 | Starck et al. | 219/204 |
| 2009/0121459 A1 | | 5/2009 | Bostick et al. | |
| 2009/0140994 A1 | | 6/2009 | Tanaka et al. | |
| 2009/0165592 A1 | | 7/2009 | Sakai et al. | |

FOREIGN PATENT DOCUMENTS

| | | | |
|---|---|---|---|
| DE | 10 2008 054 721 B3 | * | 4/2010 |
| JP | 2001-055149 A | | 2/2001 |
| JP | 2001-114112 A | | 4/2001 |

OTHER PUBLICATIONS

PTO STIC Machine Translation of JP 2001-55149, Hosoi, Published Feb. 27, 2001.*
PTO STIC Machine Translation of JP 2001-114112, Yoshinaga et el., Published Apr. 24. 2001.*
Merriam-Webster's Collegiate Dictionary, 10th Ed., 1999, p. 268.

* cited by examiner

*Primary Examiner* — Vinh T. Luong

(74) *Attorney, Agent, or Firm* — Foley & Lardner LLP

(57) ABSTRACT

A steering wheel comprises a rim connected to spokes. A covering material is provided to enclose at least a portion of the rim and/or the spokes. The covering material includes an outer cover and a light element positioned under the outer cover. The light element is configured to emit light through at least a portion of the outer cover. The light element is positioned over a casing that is provided to give shape to the steering wheel so that a vehicle driver may easily grasp the steering wheel. The light element may provide continuous, pulsed, or non-continuous lighting.

17 Claims, 2 Drawing Sheets

BACK LIGHT OF STEERING WHEEL

CROSS-REFERENCE TO RELATED PATENT APPLICATIONS

This application is a Divisional of U.S. patent application Ser. No. 11/558,584, filed Nov. 10, 2006, which claims priority to U.S. Provisional Patent Application No. 60/735,201, filed Nov. 10, 2005, which are incorporated herein by reference in their entirety.

BACKGROUND

The invention relates to a steering wheel having at least one covering material, wherein the covering material includes back lighting under an outer cover material.

Steering wheels generally include a steering wheel skeleton and a casing. In addition, covering parts of a shape-stable material are frequently attached to the steering wheel. These covering parts can have a decorative function or can be gripped by a vehicle driver to control the steering wheel.

SUMMARY

One embodiment of the invention relates to a steering wheel material. The material comprises a covering material. The covering material includes an outer cover and a light element positioned under the outer cover. The light element is configured to emit light through at least a portion of the outer cover.

Another embodiment of the invention relates to a steering wheel. The steering wheel comprises a rim connected to spokes and a covering material enclosing at least a portion of the rim and/or spokes. The covering material includes an outer cover and a light element positioned under the outer cover. The light element is configured to emit light through at least a portion of the outer cover.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

An object of the invention is to provide a steering wheel or steering wheel material that includes at least one covering material, wherein the covering material includes back lighting under the covering material.

According to an embodiment, a steering wheel includes a covering material, wherein the covering material includes back lighting under the covering material.

According to an embodiment, a steering wheel material includes a covering material, wherein the covering material includes back lighting under the covering material.

Embodiments of the present invention will be described below with reference to the drawings.

A steering wheel 1 includes a steering wheel rim 3 connected to spokes 4. The rim 3 and spokes 4 can be enclosed by a casing 110. The casing 110 can be a foam material or other material known in the art with similar properties, such as shape-retention and/or softness. For example, the casing 110 may be made of polyurethane (PUR) foam.

Figure 1:
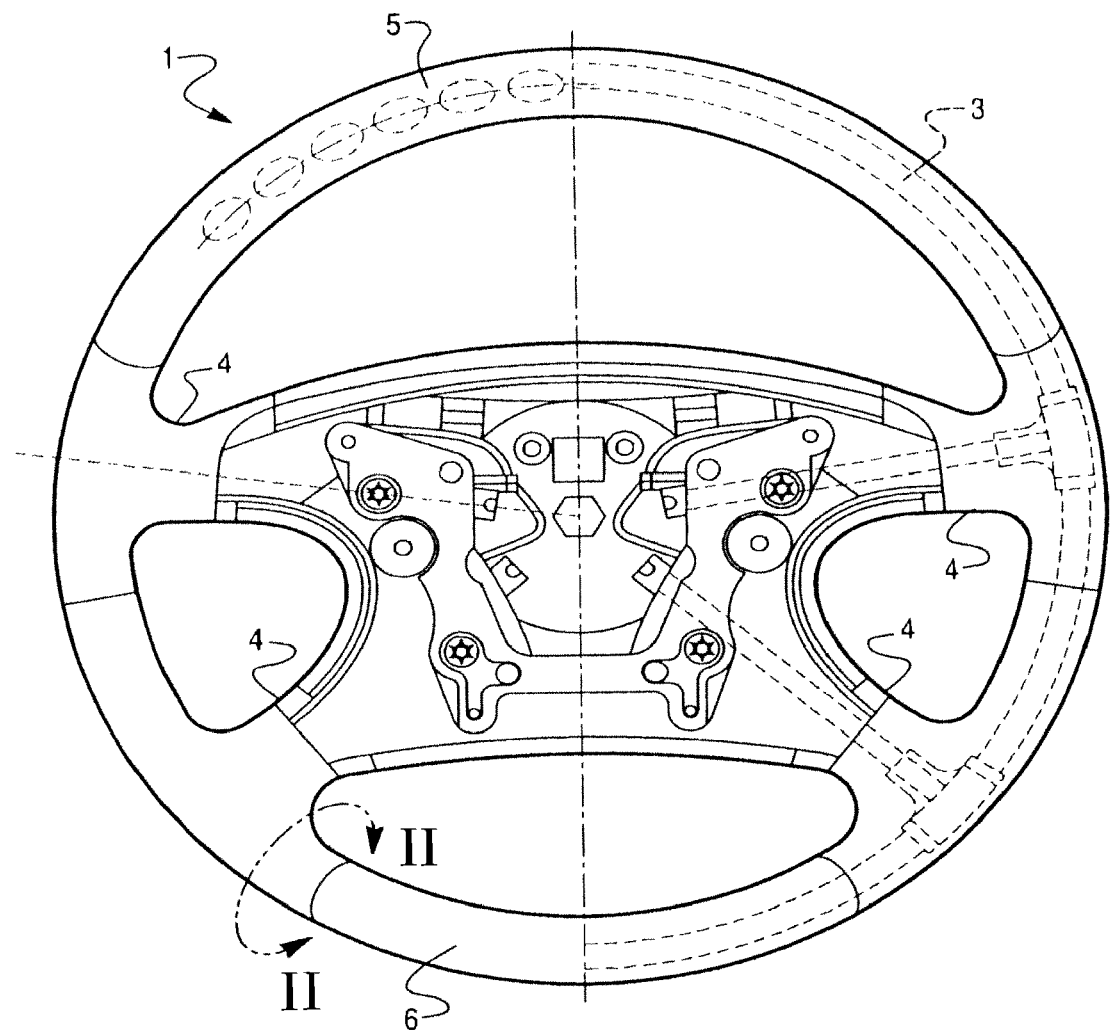
FIG. 1 is a plan view of a steering wheel according to an embodiment.

The steering wheel 1 is provided on its front part with covering parts 5, 6 that include a covering material 100. In the example shown in FIG. 1, two covering parts 5, 6 are shown. However, embodiments of this invention can be used with other covering arrangements for a steering wheel 1, such as, for example, an arrangement with multiple coverings that cover different segments of the steering wheel 1, or an arrangement with a single covering that covers the entire rim 3 and/or spokes 4 of the steering wheel 1.

Figure 2:
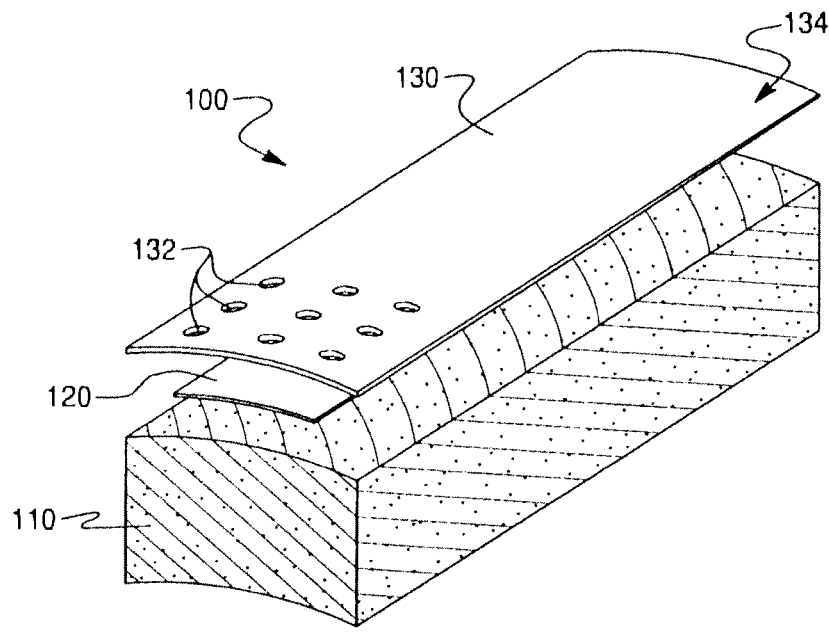
FIG. 2 is a sectional view of a covering material for a steering wheel according to an embodiment.

FIG. 2 shows a sectional view of a covering material 100 according to one embodiment. The covering material 100 may include the casing 110, a light element 120, and an outer cover 130. The casing 110 may be used to provide shape to the steering wheel 1 so that a vehicle driver may easily grasp the steering wheel 1 and control the vehicle. The casing 110 may be made of a foam material that serves as a base for the covering material 100. The covering material 100 may include a plurality of light elements 120 and/or a plurality of outer coverings 130 that are arranged in multiple layers. Furthermore, the steering wheel 1 may include additional layers between the outer cover 130 and the rim 3 and/or spokes, such as, for example, insulating layers or other layers to aid in driver comfort or feel. By way of example, a layer including a temperature controlling substance may be included.

The light element 120 may be provided to serve as a source of light that is emitted from the steering wheel 1. The light element 120 may be located on top of the casing 110 and underneath the outer cover 130 to provide back lighting of the steering wheel 1. The light element 120 may be electroluminescent mylar, electroluminescent tubing, at least one discrete light emitting diode (LED), incandescent material or wires, fiber optic material, lit acrylic, or other suitable light emitting materials and devices known in the art.

The light element 120 may include a single light element or the light element 120 may include a plurality of light elements. The light element 120 may be arranged so that the entire rim and/or spokes of the steering wheel 1 may be lit by the light element 120, or the light element 120 may be arranged so that portions of the steering wheel 1 may be lit. For example, a plurality of light elements 120 may be arranged to light separate sections of the steering wheel 1, or a plurality of light elements 120 may be arranged to light a single section of the steering wheel 1.

The light element 120 may be attached to the steering wheel 1 in any suitable manner. For example, the light element 120 may be attached to the steering wheel 1 with glue, snap-in fasteners, screws, tacking, sewing, or any other suitable fastener or mechanism.

The light element 120 may be arranged to provide continuous back lighting, pulsed back lighting, or non-continuous back lighting of the steering wheel 1. The light element 120 may be arranged to provide back lighting with an effect, such as, for example, flashing lights, colors, patterns, and other effects known in the art.

The light element 120 may provide back lighting of the steering wheel 1 by emitting light that passes through the outer cover 130. The outer cover 130 may be arranged to permit light to pass through the outer cover 130 by providing holes or perforations 132 in the outer covering. The holes or perforations 132 may occur naturally in the material of the outer cover 130 or may be artificially provided during manufacture of the outer cover 130 or covering material 100. When the outer cover 130 is made from a woven fabric, such as cloth, the outer cover 130 may be arranged to permit light to pass through the outer cover 130 by permitting the light to pass through gaps in the warp and weft of the fabric. The outer cover 130 may be arranged to permit light to pass through the outer cover 130 by providing a thinned area 134 of the outer cover 130 where the thickness of the outer cover 130 has been arranged, minimized, or reduced to allow light to be transmitted through the material of the outer cover 130.

Figure 3:
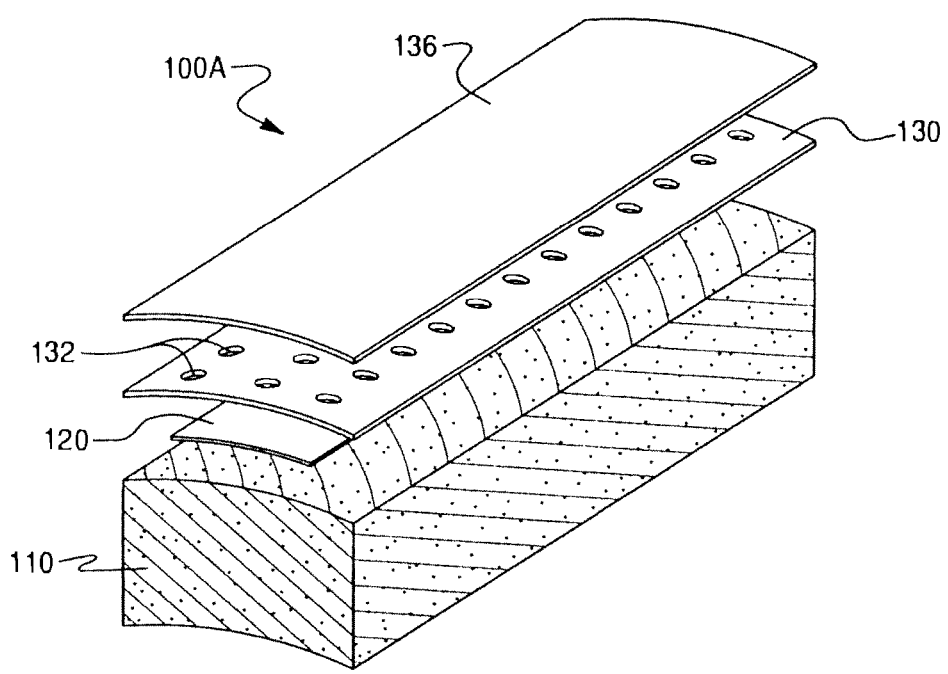
FIG. 3 is a sectional view of a covering material for a steering wheel according to another embodiment.

FIG. 3 illustrates a steering wheel material according to another embodiment. The steering wheel material includes a covering material 100A that may be further treated so that a sealant material 136 is provided on the outer cover 130. The sealant material 136 may fill gaps, holes, or perforations 132 in the outer cover 130. The sealant material 136 is configured to permit light emitted from the light element 120 to pass through the outer cover 130. The sealant material 136 may be a clear or translucent material such that the material 136 is capable of allowing light to pass through.

The covering material 100A may be further treated such that other suitable materials are provided to fill gaps or perforations 132 in the outer cover 130. The other suitable materials can still permit light from the light element 120 to pass through. The other suitable materials may be opaque, comprise a color, comprise multiple colors, and/or comprise different textures.

The outer cover 130 may be made of any suitable covering material, such as natural leather, simulated leather, polyurethane, thermoplastics, vinyl, cloth, wood, or other materials known in the art. The outer cover 130 may also be made from a clear or translucent material. The outer cover 130 may be made from a luminescent or phosphorescent material that is activated by light emitted from the light element 120.

By providing a covering material 100 that provides back lighting for a steering wheel 1, additional design options are created for a steering wheel 1. Additional decorative techniques may be used by customer designs studios. Furthermore, customer satisfaction with a vehicle may be increased with innovative designs of the covering material 100. The covering material 100 may be used for cosmetic functions and/or utility functions, such as, for example, communications or warnings from various vehicle systems. In such utility functions, effects of the light emitted from the covering material 100 may be linked to various vehicle systems.

For example, the back lighting provided by the covering material 100 may be used in conjunction with the systems of a vehicle to provide various functions. For example, the back lighting provided by the covering material 100 may be used in conjunction with a collision avoidance system of a vehicle to provide a warning. In another example, the covering material 100 may be used to provide a direction indication in conjunction with a vehicle's turn signals. In another example, the covering material 100 may be used in conjunction with the tachometer. In another example, the covering material 100 may be used to provide a shift indication for the driver of the vehicle. In another example, the cover material 100 may be used to In another example, the covering material 100 may be used in conjunction with a navigation assistance system of the vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A steering wheel, comprising:
   a rim; and
   a covering material disposed about the rim, the covering material including:
      an outer cover; and
      a light element positioned under the outer cover, and wherein the light element is configured to emit light through at least a portion of the outer cover,
   wherein the outer cover includes a first area portion, a second area portion, and a third area portion configured to form a continuous portion, wherein the third area portion is configured to be thinner than the first area portion, wherein the first area portion includes at least one perforation to permit light from the light element to pass through each of the perforations in the first area portion, wherein the second area portion is substantially impermeable to light, and wherein light from the light element is configured to transmit through the third area portion;
   wherein the covering material further includes a sealant material configured to seal the at least one perforation in the outer cover.

2. The steering wheel of claim 1, wherein the sealant material is configured to permit light emitted from the light element to pass through the sealant material.

3. The steering wheel of claim 1, wherein the light element includes electroluminescent mylar.

4. The steering wheel of claim 1, wherein the light element includes electroluminescent tubing.

5. The steering wheel of claim 1, wherein the light element includes at least one light emitting diode.

6. The steering wheel of claim 1, wherein the light element includes incandescent material or wires.

7. The steering wheel of claim 1, wherein the light element includes fiber optic material.

8. The steering wheel of claim 1, wherein the light element includes light emitting acrylic.

9. The steering wheel of claim 1, wherein the sealant material fills the at least one perforation.

10. A steering wheel, comprising:
    a rim connected to spokes; and
    a covering material positioned about at least a portion of the rim and/or spokes, the covering material including an outer cover and a light element positioned under the outer cover, and
    wherein the light element is configured to emit light through at least a portion of the outer cover,
    wherein the outer cover includes a first area portion, a second area portion, and a third area portion configured to form a continuous portion, wherein the third area portion is configured to be thinner than the first area portion, wherein the first area portion includes at least one perforation to permit light from the light element to pass through each of the perforations in the first area portion, wherein the second area portion is substantially impermeable to light, and wherein light from the light element is configured to transmit through the third area portion;

wherein the covering material further includes a sealant material configured to seal the at least one perforation in the outer cover.

11. The steering wheel of claim 10, wherein the light element includes electroluminescent mylar.

12. The steering wheel of claim 10, wherein the light element includes electroluminescent tubing.

13. The steering wheel of claim 10, wherein the light element includes at least one light emitting diode.

14. The steering wheel of claim 10, wherein the light element includes incandescent material or wires.

15. The steering wheel of claim 10, wherein the light element includes fiber optic material.

16. The steering wheel of claim 10, wherein the light element includes light emitting acrylic.

17. The steering wheel of claim 10, wherein the sealant material is configured to permit light emitted from the light element to pass through the sealant material.

* * * * *